United States Patent

Brakus

[11] Patent Number: 5,317,499
[45] Date of Patent: May 31, 1994

[54] DIRECT-CURRENT CONVERTER WITH CURRENT LIMITING

[75] Inventor: Bogdan Brakus, Stockdorf, Fed. Rep. of Germany

[73] Assignee: Siemens Aktiengesellschaft, Munich, Fed. Rep. of Germany

[21] Appl. No.: 941,448

[22] PCT Filed: Apr. 16, 1991

[86] PCT No.: PCT/EP91/00724
§ 371 Date: Oct. 26, 1992
§ 102(e) Date: Oct. 26, 1992

[87] PCT Pub. No.: WO91/16756
PCT Pub. Date: Oct. 31, 1991

[30] Foreign Application Priority Data

Apr. 16, 1990 [DE] Fed. Rep. of Germany ..... 90107934

[51] Int. Cl.[5] .......................................... H02M 3/335
[52] U.S. Cl. ......................................... 363/56; 363/21; 363/127
[58] Field of Search ............................. 363/21, 56, 127; H02M 3/335

[56] References Cited

U.S. PATENT DOCUMENTS 4,772,995 9/1988 Gautherin et al. ...................... 363/21
4,985,818 1/1991 Niederreiter .......................... 363/19

FOREIGN PATENT DOCUMENTS 2613896 10/1977 Fed. Rep. of Germany ......... H02H 7/127
2838009 1/1980 Fed. Rep. of Germany ......... H02H 9/02
228687 10/1985 German Democratic Rep. ... 363/21
56-60920 5/1981 Japan ..................................... 363/21
58-43016 3/1983 Japan ..................................... 363/21

OTHER PUBLICATIONS

Matino, "FET Rectifier Circuit," IBM Tech. Discl. Bul., vol. 23, No. 10, p. 4527, Mar. 1981.
SIPMOS, 1984/85, pp. 24 and 25. "Technische Angaben".

Primary Examiner—William H. Beha, Jr.
Attorney, Agent, or Firm—Hill, Steadman & Simpson

[57] ABSTRACT

A direct-current converter has an electronic switch which can be made conductive by switch-on pulses and has current limiting by suppression of switch-on pulses. In order to make do with a low-loss current sensor which is easy to realize, a direct voltage corresponding to the peak value of the current is obtained with the aid of an additional switch, in phase with the electronic switch, which is preferably a reverse-operated field-effect transistor. The converter is particularly suitable for applications in which low-impedance short circuits at the output of the converter have to be taken into account.

7 Claims, 4 Drawing Sheets

DIRECT-CURRENT CONVERTER WITH CURRENT LIMITING

BACKGROUND OF THE INVENTION

FIG. 1 shows a direct current changer with instantaneous value current limiting which is also known as pulse by pulse limiting and is known from DE-PS 26 13 896.

In the single-ended forward converter shown in FIG. 1, the input voltage $U_E$ is applied to the capacitor 1 and the output voltage $U_A$ to the capacitator 13. A series circuit formed from the primary winding 91 of the transformer 9, the drain-source junction of the field-effect transistor 6 and the measuring resistor 3 is connected in parallel with the capacitor 1. The Z diode 5 which serves to limit the voltage is connected in parallel with the series circuit comprising the measuring resistor 3 and the source-drain junction of the field-effect transistor 6. The rectifier diode 10 is connected between the secondary winding 92 of the transformer 9 and the capacitor 13. The freewheeling diode 1 is arranged in a shunt arm following the rectifier diode 10. The inductor 12 is located in a longitudinal branch between the freewheeling diode 11 and the capacitor 13.

The control electrode of the field-effect transistor 6 is connected to the control device 8 which contains a driver, a clock generator and a pulse-width modulator. The control arrangement 8 is controlled both by the comparator 4 and by the voltage controller 14. The comparator 4 is connected by its negative input via the reference voltage source 2 to one terminal of the measuring resistor 3 and via its positive input directly to the other terminal of the measuring resistor 3. The voltage controller 14 serves to control the output voltage and is therefore connected by its actual value input to the output of the converter.

With a circuit arrangement of this kind, adequate current limiting can be achieved in many cases. However, in the case of converters with a relatively high output voltage, for reasons based on the principle of a so-called "running-out of the characteristic" occurs; that is to say, the limiting effect is reduced or eliminated in the case of a short circuit. This can ultimately lead to the destruction of components. The cause for behavior of this kind lies in the remaining minimum pulse width of the switch-off and on pulse which is produced by a series of dead times in the control chain. If an LC element with an inductor in the longitudinal arm and a capacitor in the shunt arm is arranged in the output circuit and if—due to the aforesaid minimum pulse width—the positive voltage-time area applied to the output inductor during switching on is greater than the negative one in the switch-off phase, the magnetic energy rises and thus the current rises in an unlimited fashion from period to period. This is also confirmed by the following inequality which applies in the case of a terminal short circuit:

$$U_E \ddot{u} \cdot t_{Emin} > U_{DF}(T - t_{Emin}) \quad (1)$$

where
$U_E$ = Input voltage
$\ddot{u}$ = Transformation ratio of the transformer
$t_{E\,min}$ = Minimum switch-on period
$U_{DF}$ = Conductive-state voltage of the freewheeling diode $T$ = Duration of period. In FIG. 2, the typical operating states are illustrated:
a = Onset of current limiting
b = Threshold case in which the minimum switch-on period still just permits the limiting effect.
c = Reduced limiting effect in the short circuit due to the condition (1)

As FIG. 2 shows, the problem described cannot be solved with pure instantaneous value limiting.

It is therefore expedient to provide an additional circuit for current limiting in the case of a short circuit.

The invention relates to a direct-current converter with current limiting.

A current converter of this kind is already known from DE-B1-28 38 009.

In the case of the known converter, a power switching transistor is driven by a clock generator with switch-on pulses at a constant operation frequency. In order to control the output voltage, the pulse duty cycle, that is to say the quotient of the switch-on time of the power switching transistor divided by the duration of the period, is changed. In the case of overloading at the output of the direct-current converter, the current in the power circuit is limited in order to protect the components. This is achieved by shortening the switch-on time. Here, the switching transistor is inhibited with the aid of a current measuring circuit as soon as the instantaneous value of the current flowing through the switching transistor, which current is measured with the aid of a current transformer, exceeds a predetermined limiting value.

Since the storage time of the switching transistor requires a minimum switch-on time and this minimum switch-on time would require an economically unacceptable over-dimensioning of the power circuit components in the case of a short circuit, in the known converter a further current measuring circuit, which is connected via a diode to the load of the current transformer, intervenes when the minimum switch-on time of the switching transistor ought to have been undershot and the voltage at the load of the current transformer has therefore risen by more than the threshold voltage of the diode. It interposes—if appropriate, repeatedly—switching pauses lasting for several periods so that the current in the power circuit does not rise above a predetermined limit. In this way, a larger degree of current limiting can be achieved.

The additional circuit ensures that the output inductor remains in magnetic equilibrium and the limiting effect is also maintained in the short circuit, but is associated with very high expenditure.

SUMMARY OF THE INVENTION

The object of the invention is to construct a pulsed converter of the type mentioned at the beginning in such a way that a current measuring resistor with the lowest possible resistance is adequate as a current sensor for active current limiting and a peak value of the current is formed and stored in a low-loss manner. In particular, a low temperature dependency is intended to be produced with little expenditure.

According to the invention, the converter for achieving this object is constructed having an electronic switch which is arranged in the main circuit and connected by its control input to a control circuit and capable of being alternately switched on and off by the control circuit, having a current sensor arrangement in series with the electronic switch, having an evaluation arrangement arranged between the current sensor and a capacitor with a discharge circuit, and having a control device which is connected to the capacitor and, in the case of capacitor voltages lying above a predetermined limiting value, controls the control circuit to the effect of limiting the pulse current flowing in the main circuit, wherein the current sensor is formed by a measuring resistor and the evaluation arrangement is formed by a further electronic switch and wherein the further electronic switch which is otherwise inhibited can be placed in the conductive state in each case during the switched-on phase of the electronic switch arranged in the main circuit.

The further electronic switch is also inhibited during the entire inhibiting phase of the electronic switch located in the main circuit. It can also be conductive during the entire switch-on phase of the electronic switch located in the main circuit. Since the peak value to be stored is produced only at the end of the conductive phase, the further electronic switch can, if appropriate, be driven in such a way that it is made conductive only in a temporary subdivision of the switch-on phase of the switching transistor located in the main circuit, in such a way that both electronic switches are simultaneously transferred from the conductive state into the inhibited state. In this way, switch-on current surges during switching-on of the capacitor can be reduced, or voltage surges which occur due to switch-on current surges of the main circuit at the measuring resistor can be faded out. The invention furthermore has the advantage that a low temperature dependency is ensured with particularly little expenditure.

In the non-prepublished European Patent Application with the file number 89 111 982.8, a pulsed converter is already known which, in addition to an electronic switch fitted in the main circuit, has a further electronic switch which is arranged between a measuring resistor located in the main circuit and an RC-Parallel circuit. This additional electronic switch is switched on and off in delayed fashion with respect to the first-mentioned electronic switch. The voltage on the capacitor follows the measured voltage on the measuring resistor. At the time of the delayed switching-off of the additional electronic switch, the capacitor is already discharged.

The data book "SIPMOS-Kleinsignaltransistoren, Leistungstransistoren, Siemens AG, (SIPMOS small signal transistors, power transistors, Siemens AG), Issue 84/85, Order No. B3-3209, pages 24 and 25 admittedly discloses that rectifier circuits can be realized with extremely low conductive state voltages with the aid of field-effect transistors. However, when realizing such a rectifier circuit, a control circuit is required which transfers the field-effect transistor into the conductive or inhibited state as a function of the polarity of the voltage applied to the field-effect transistor.

It is advantageous that the converter according to the invention does not require such a control circuit.

Further advantageous embodiments of the invention include forming the further electronic switch by the source-drain junction of a field-effect transistor and wherein the source-drain junction of the field-effect transistor is directed in such a way that the reverse diode of the field-effect transistor is polarized in the conductive direction with respect to the voltage occurring on the measuring resistor, and wherein the measuring resistor is dimensioned in such a way that the voltage dropped on it is smaller than the threshold voltage of the reverse diode of the field-effect transistor.

The electronic switch located in the main circuit is formed by a field-effect transistor wherein both field-effect transistors are of the same conductance type and wherein terminals with the same polarity of the two field-effect transistors and the current measuring resistor are connected to one another. Furthermore, the gate electrodes of the two field-effect transistors may be connected to one another.

In a preferred embodiment, the capacitor and a reference voltage source are connected in single pole fashion to a reference potential and are connected by their free terminals to the inputs of a comparator whose output is connected to an inhibiting input of the control circuit. In addition, a source for a synchronous triangular waveform signal may be arranged between the capacitor and the comparator or between the reference voltage source and the comparator.

Alternatively, the capacitor and the reference voltage source may be connected in single pole fashion to a reference potential and may be connected by their free terminals to the inputs of an operational amplifier whose output is connected to a pulse-width modulator of the control circuit and inhibits the pulse-width modulator in the case of current limiting. The output of the operational amplifier may be connected to a voltage-controlled oscillator of the control circuit so as to reduce the frequency of the oscillator in the case of current limiting. The measuring resistor may serve simultaneously as an actual value generator of a current controller with superimposed voltage control, in which the actual value of the voltage is the reference value of the current control.

The invention is explained in greater detail with reference to the exemplary embodiments shown in FIGS. 3, 5 and 6 and with reference to the pulse diagrams according to FIGS. 4 and 7.

DETAILED DESCRIPTION OF THE PREFERRED EMBODIMENTS

Figure 1:
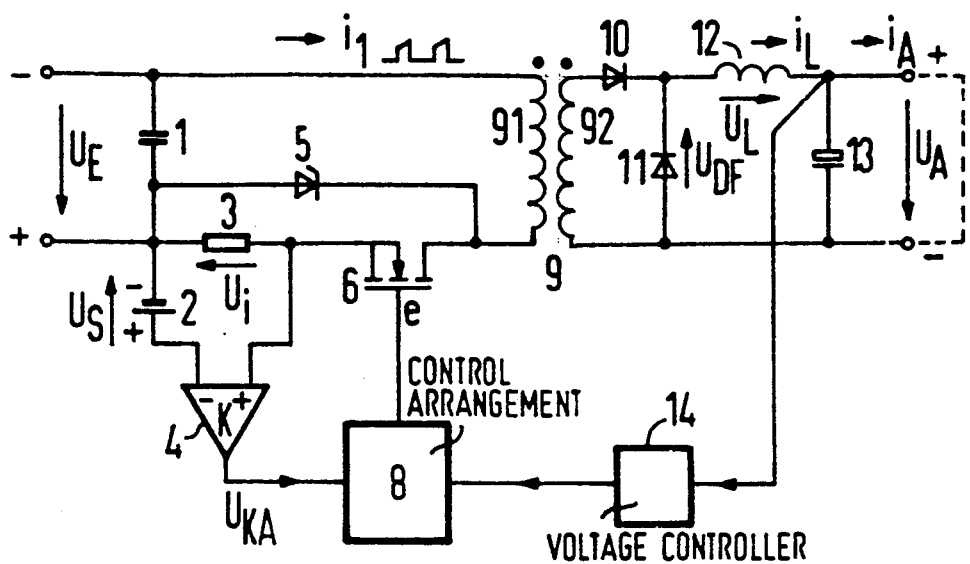
FIG. 1 shows a known converter.
Figure 2:
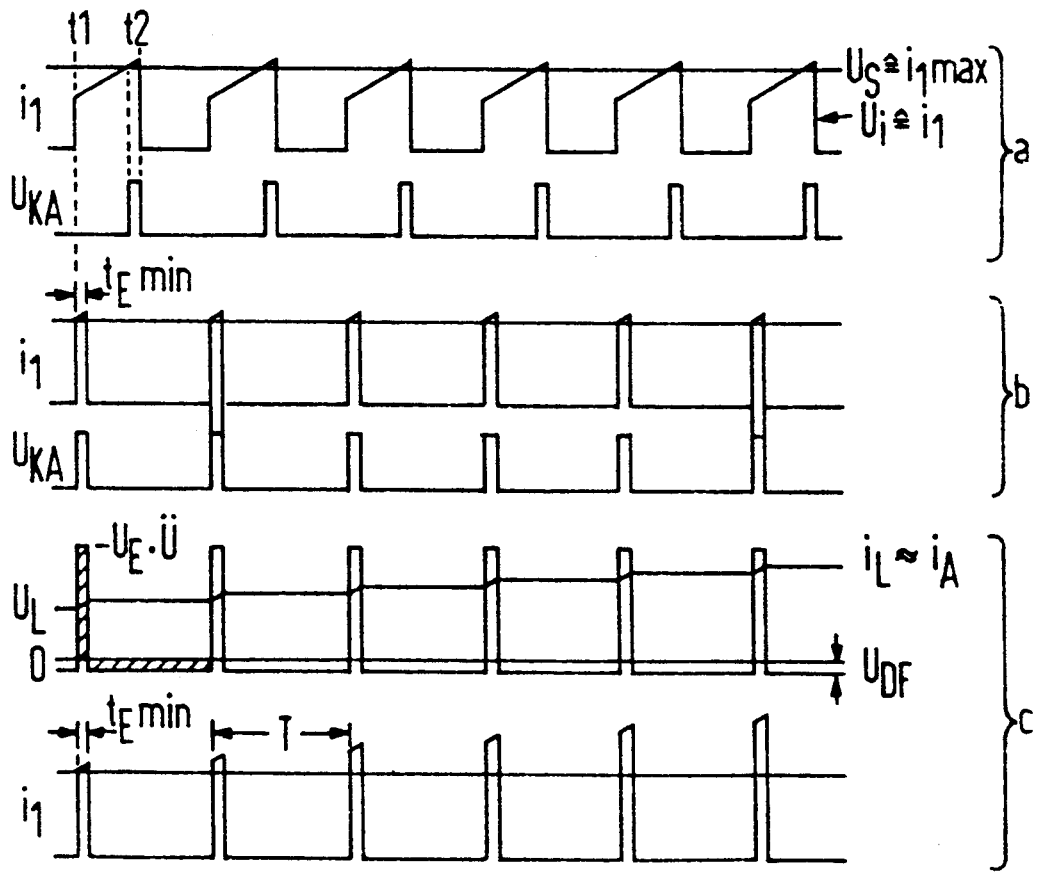
FIG. 2 shows a pulse diagram for the converter according to FIG. 1.
Figure 3:
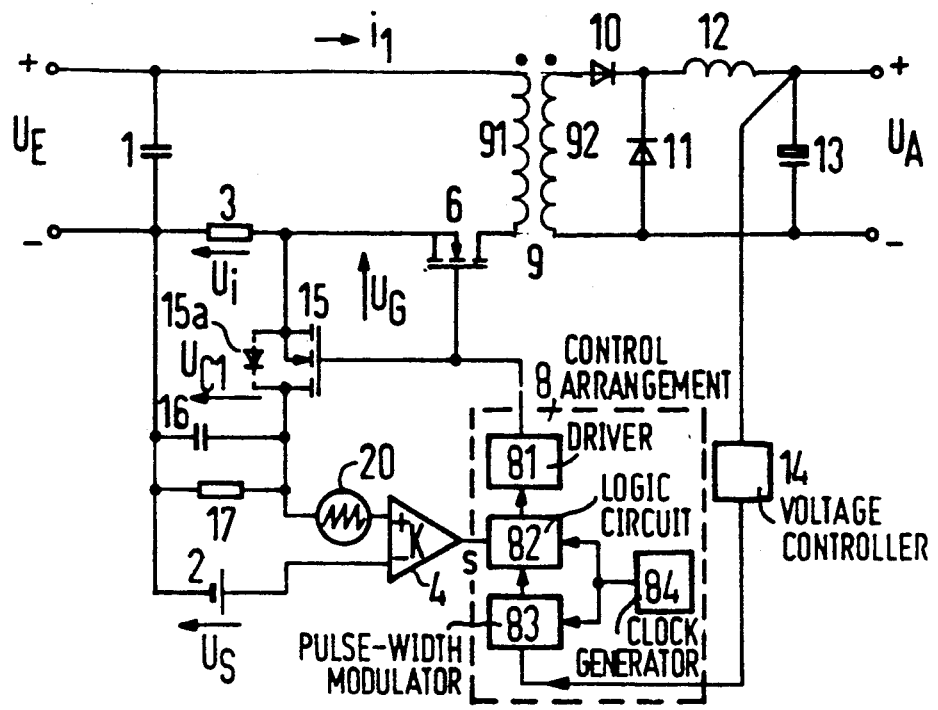
FIG. 3 shows a converter with suppression of switch-on pulses with the aid of a comparator.

In FIG. 3, a pulsed converter according to the invention is illustrated.

In the single-ended forward converter shown in FIG. 3, the input voltage $U_E$ is applied to the capacitor 1 and the output voltage $U_A$ to the capacitor 13. A series circuit formed from the primary winding 91 of the transformer 9, the drain-source junction of the field-effect transistor 6 and the measuring resistor 3 is connected in parallel with the capacitor 1. The rectifier diode 10 is located between the secondary winding 92 of the transformer 9 and the capacitor 13. The free-wheeling diode 11 is arranged in a shunt arm following the rectifier diode 10. The inductor 12 is located in a longitudinal arm between the freewheeling diode 11 and the capacitor 13.

An evaluation arrangement, which is composed of the field-effect transistor 15, the capacitor 16 and the resistor 17 which forms a discharge circuit, is connected to the measuring resistor 3. The field-effect transistor 15 is connected by its source electrode directly to the source electrode of the field-effect transistor 6 and by its control electrode directly to the control electrode of the field-effect transistor 6. Both field-effect transistors are n-channel MOS transistors.

The capacitor 16 and the reference voltage source 2 are connected to one another in single-pole fashion. The comparator 4 is connected by its inverting input to the reference voltage source 2 and by its non-inverting input to the capacitor 16 via the triangular-waveform voltage source 20. Here, the source electrodes of the two field-effect transistors 6 and 15 are connected directly to one another and to the measuring resistor 3.

The control device 8 serves to control the output voltage $U_A$. The control circuit extends from the output of the converter via the voltage controller 14, the pulse-width modulator 83, the logic circuit 82 and the driver 81 to the connecting point of the control electrodes of the two field-effect transistors 6 and 15.

The logic circuit 82 and the pulse-width modulator are jointly controlled by the clock generator 84. The logic circuit 82 is also connected by an inhibiting input to the output of the comparator 4, which compares the reference voltage $U_S$ of the reference voltage generator with a composite voltage, which is composed of the voltage $U_{C1}$ applied to the capacitor 16, and the triangular voltage f the triangular-waveform voltage generator 20. If appropriate, the triangular-waveform voltage generator 20 can be located in the reference value branch instead of in the actual value branch. With suitable selection of the working range, the triangular-waveform voltage generator 20 can be replaced by a short circuit.

With the aid of the n-channel MOS transistor 15 driven in synchronism with the switching transistor 6, the capacitance C1 of the capacitor 16 is given low impedance, that is to say, is charged quickly and accurately to the maximum value of the voltage on the measuring resistor 3. The comparatively slow reverse diode 15a, which is unnecessarily contained in the field-effect transistor 15 and is therefore illustrated by a dashed line, of the MOS-transistor 15 is therefore virtually without effect since its threshold voltage is not achieved in the conducting direction. In the inhibiting phase, the field-effect transistor 15 very quickly acquires high impedance and prevents reverse discharge. The capacitor 16 can be discharged more or less slowly with the desired time constant via the resistor 17. Since the residual resistance $R_{DSON}$ of the field-effect transistor 15 is very small with respect to the resistance value of the discharge resistor 17, the voltage on the capacitor 16 corresponds very closely to the maximum value of the measured current.

Figure 4:
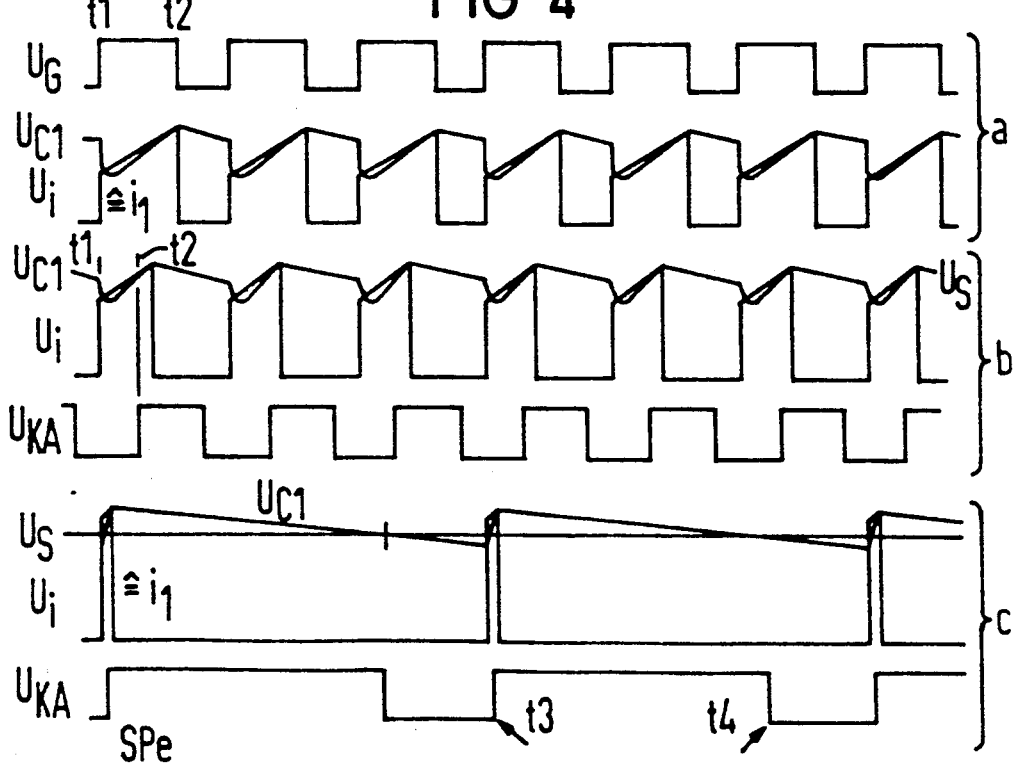
FIG. 4 shows a pulse diagram for the converter according to FIG. 3.

The pulse diagram according to FIG. 4 shows this fact. The output voltage $U_G$ of the driver 81 is composed of switch-on pulses which are fed to the gate-source junctions of the field-effect transistors 6 and 15 and switch over respectively at the time t1 into the switch-on state and at the time t2 into the off state. The voltage $U_i$ drops on the measuring resistor 3 and corresponds to the current i1 flowing in the main circuit of the converter. The voltage $U_{C1}$ is produced on the capacitor 16. The output voltage $U_{KA}$ of the comparator 4 is a sequence of square-wave pulses. The rising edge at time t3 constitutes the start of an inhibiting signal, the trailing edge at time t4 constituting the start of an enable signal.

The brief discharging of the capacitor 16 at the start of the pulse, caused by the sharp rise of the current i1 is practically insignificant since the peak value of the current i1 is not produced until the end of the conductive phase and remains stored after switching off. The basic response of the measured value $U_i$ corresponding to the current i1 is illustrated in FIG. 4.

The voltage on the capacitor 16 is evaluated according to FIG. 3 with the aid of a comparator 4. The triangular-waveform voltage source 20 supplies an external synchronous triangular-waveform signal which is superimposed on the voltage $U_{C1}$. A superimposition of this kind of an external synchronous triangular-waveform signal which is known per se from DE-PS 26 13 896 is advantageous for the evaluation with the comparator 4. In this way, on the one hand a defined switching criterion is acquired, and on the other hand the stability in the subharmonic range is increased. In the pulse diagram according to FIG. 4, this triangular signal is not illustrated for the sake of clarity.

In FIG. 4, the basic signal response for current limiting according to use and in the case of a short circuit is illustrated. The number of omitted pulses in case c depends on the minimum pulse width and on the conductive state voltage of the freewheeling diode 11.

Figure 5:
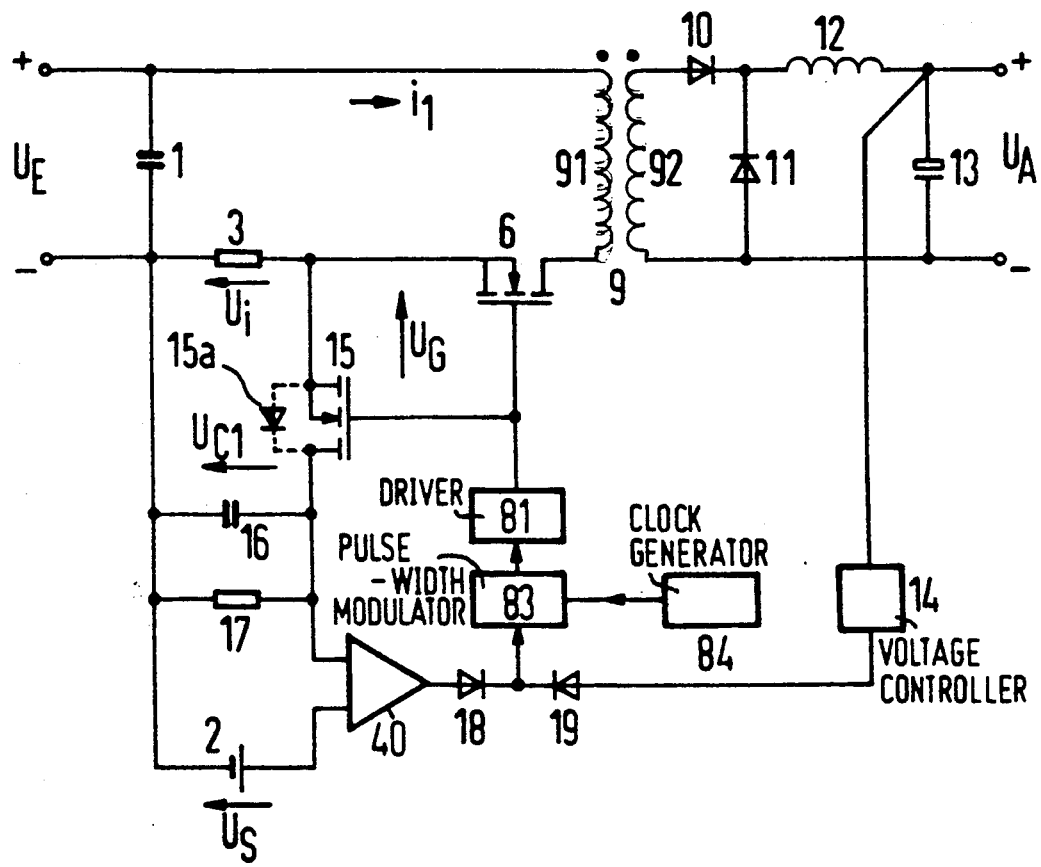
FIG. 5 shows a current changer with suppression of switch-on pulses with the aid of a differential amplifier.

In the converter according to FIG. 5, an operational amplifier 40 is provided in place of the comparator 4 in FIG. 3. The output of the operational amplifier 4 and the output of the current controller 14 are connected via in each case one diode 18 or 19 to the input of the pulse-width modulator 83 so that a so-called override control is produced. The driver 81 is connected directly to the pulse-width modulator 83.

In this embodiment, the amplified control deviation controls the pulse-width modulator 83 and sets the operating point. In the case of a short circuit, the amplified control deviation can inhibit the pulse-width modulator 83 for several periods when required and as a result fully maintain the limiting effect. The converter operates similarly to the manner shown in FIG. 4.

Figure 6:
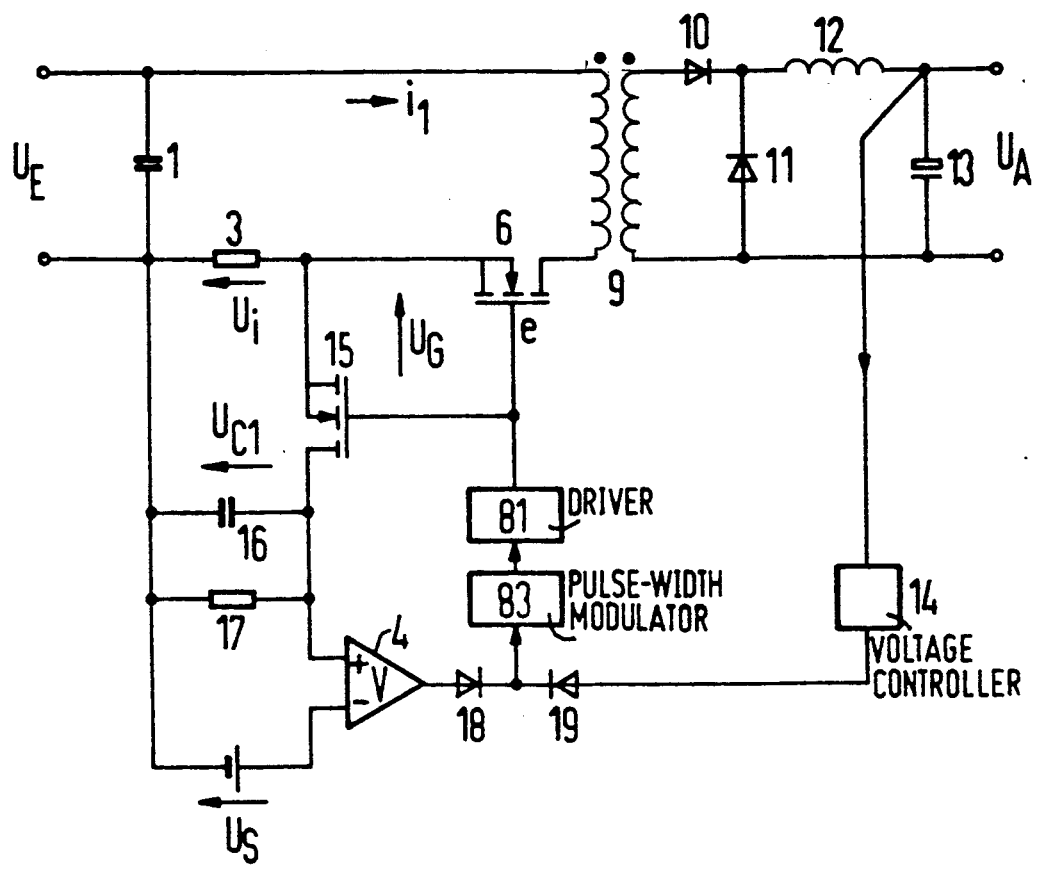
FIG. 6 shows a converter with a voltage-controlled oscillator and FIG. 7 shows a pulse diagram for the converter according to FIG. 6.
Figure 7:
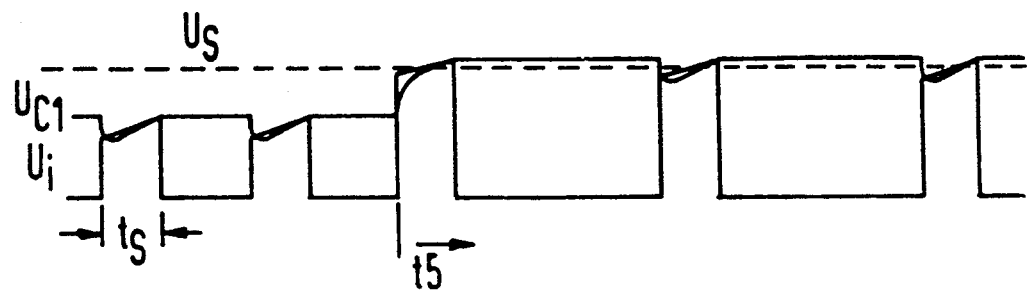

A further embodiment is illustrated in FIG. 6. This is particularly advantageous in the case of radio-frequency converters. In the case of overloading, the operational amplifier 4 amplifies the control deviation $U_S-U_{C1}$ and adjusts the voltage-controlled oscillator towards lower frequencies as illustrated in FIG. 7. However, the switch-on duration of the current pulse remains constant. However, due to continuous frequency reduction, the desired state of equilibrium is also achieved in the case of a short circuit of the output terminals of the converter.

The converters illustrated in FIGS. 1, 3, 5 and 6 can be set over a very wide frequency range since the field-effect transistor can be a small MOS transistor with switching times of approximately 5-20 ns and can have very small parasitic capacitances, e.g. of approximately 5 pF. The switching frequency can be approximately 1-2 MHz.

The converter can be constructed as a forward converter or as an inhibiting converter with a constant clock frequency or as a converter with frequency modulation.

Current control with superimposed voltage control (current-mode voltage control), in which the output signal of a voltage controller serves as the reference value of the current, is readily possible with the aid of the measuring signal at the current measuring resistor 3, since the signal at the low-resistance measuring resistor 3 is virtually uncorrupted even in the time periods essential for the control.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A pulsed converter with current limiting comprising: an electronic switch arranged in a main circuit and connected by its control input to a control circuit and capable of being alternately switched on and off by the control circuit; a current sensor arranged in series with the electronic switch; an evaluation arrangement arranged between the current sensor and a capacitor with a discharge circuit; a first control device connected to the capacitor and with capacitor voltages lying above a predetermined limiting value, controls a second device by limiting a pulse current flowing in the main circuit, wherein the current sensor is formed by a measuring resistor and the evaluation arrangement is formed by a further electronic switch wherein the further electronic switch which is otherwise inhibited can be placed in the conductive state by the control circuit in each case during the switched-on phase of the electronic switch arranged in the main circuit, wherein the further electronic switch is formed by the source-drain junction of a field-effect transistor and wherein the source-drain junction of the field-effect transistor is directed such that the reverse diode of the field-effect transistor is polarized in the conducting direction with respect to the voltage occurring on the measuring resistor and wherein the measuring resistor is dimensioned such that the voltage dropped at it is smaller than the threshold voltage of the reverse diode of the field-effect transistor.

2. The converter as claimed in claim 1, wherein the electronic switch located in the main circuit is formed by a field-effect transistor wherein both field-effect transistors are of the same conductance type and wherein terminals with the same polarity of the two field-effect transistors and the current measuring resistor are connected to one another.

3. The converter as claimed in claim 2, wherein the gate electrodes of the two field-effect transistors are connected to one another.

4. The converter as claimed in claim 3, wherein the capacitor and a reference voltage source are connected in single pole fashion to a reference potential and are connected by their free terminals to the inputs of a comparator whose output is connected to an inhibiting input of the second control device.

5. The converter as claimed in claim 4, wherein a source for a synchronous triangular-waveform signal is arranged between the capacitor and the comparator or between the reference voltage source and the comparator 6. The converter as claimed in claim 3, wherein the capacitor and a reference voltage source are connected in single pole fashion to a reference potential and are connected by their free terminals to the inputs of an operational amplifier whose output is connected to a pulse-width modulator of the second control device and inhibits the pulse-width modulator in the case of current limiting.

7. The current converter as claimed in claim 3, wherein the capacitor and a reference voltage source are connected in single pole fashion to a reference potential and are connected by their free terminals to the inputs of an operational amplifier whose output is connected to a voltage-controlled oscillator of the second control device and reduces the frequency of the oscillator in the case of current limiting.

* * * * *